United States Patent [19]

Tarancon

[11] Patent Number: 5,407,647
[45] Date of Patent: Apr. 18, 1995

[54] GAS-SCRUBBER APPARATUS FOR THE CHEMICAL CONVERSION OF TOXIC GASEOUS COMPOUNDS INTO NON-HAZARDOUS INERT SOLIDS

[75] Inventor: Gregorio Tarancon, High Springs, Fla.

[73] Assignee: Florida Scientific Laboratories Inc., High Springs, Fla.

[21] Appl. No.: 250,422

[22] Filed: May 27, 1994

[51] Int. Cl.⁶ .............................. B01J 8/02; B01J 8/04
[52] U.S. Cl. ..................................... 422/171; 95/139; 95/152; 422/173; 422/174; 422/176; 422/195; 422/198; 422/199; 422/220
[58] Field of Search ............... 422/191, 192, 193, 194, 422/195, 198, 199, 201, 170, 171, 173, 174, 176, 177, 211, 219, 220; 110/216; 96/152, 139

[56] References Cited

U.S. PATENT DOCUMENTS

| | | | |
|---|---|---|---|
| 1,862,243 | 6/1932 | Strindlund | 422/195 X |
| 2,983,578 | 5/1961 | Gunderson et al. | 422/195 X |
| 3,495,952 | 2/1970 | Ulbrecht et al. | 422/195 X |
| 3,498,755 | 3/1970 | Barre | 422/220 X |
| 3,533,754 | 10/1970 | Hallman | 422/220 X |

Primary Examiner—Amalia L. Santiago
Attorney, Agent, or Firm—Ezra Sutton

[57] ABSTRACT

A gas-scrubber apparatus, including a chamber having an inlet means for receiving polluted gases to be scrubbed and having outlet means through which scrubbed gases are discharged, and heating elements for heating the chamber to maintain the polluted gases at predetermined temperature levels between the inlet means and the outlet means. The chamber includes a reaction zone for receiving a mixture of solid scrubbant materials for reacting with the polluted gases and a gas blower for directing the polluted gases to travel through the chamber to react with the scrubbant materials. At least one scrubber assembly is mounted in the reaction zone of the chamber having a baffle for collecting the polluted gases in the area adjacent the wall of the chamber. The scrubber assembly also includes thermo-convection pipes for transferring the collected polluted gases from the wall area towards the center of the chamber to maintain a substantially uniform heat distribution in a horizontal direction across the scrubber assembly. The chamber also maintains a vertical temperature gradient from the bottom to the top of the reaction zone of the chamber.

24 Claims, 8 Drawing Sheets

GAS-SCRUBBER APPARATUS FOR THE CHEMICAL CONVERSION OF TOXIC GASEOUS COMPOUNDS INTO NON-HAZARDOUS INERT SOLIDS

FIELD OF THE INVENTION

This invention relates to a gas-scrubbing system for the conversion of toxic contaminant gases by chemical means in which the pollutant gases are converted into non-hazardous inert solids by using inorganic mineral oxides.

BACKGROUND OF THE INVENTION

It is well known in chemical literature and from actual operating conditions that inorganic minerals, such as oxides, hydroxides, carbonates, and bicarbonates are commonly used as reactants/catalysts in gas-scrubber systems for the chemical conversion or scrubbing of toxic compounds, such as hydrogen fluoride, fluorine, arsine, phosphine, sulphur dioxide, hydrogen sulphide, ammonia, amine, nitric oxide, chlorine dioxide, inter-halogens, hydrogen chloride, and other acid compounds; and that once they are reacted with an inorganic mineral oxide, such as aluminum oxide, calcium carbonate, sodium bicarbonate, potassium bicarbonate, chromium oxide, ferric oxide, phosphoric acid, calcium sulphate, magnesium oxide, and carbon, the converted and reacted form is a non-hazardous inert solid compound.

There are several prior art methods and various types of scrubbing apparatus which convert trace quantities of toxic gases into inert solids. But all of these methods and corresponding scrubbing equipment do not satisfactorily resolve the problem of very low conversion efficiencies caused by the low reaction rate using the inorganic scrubbant compounds or the problem of non-uniform or inadequate heat distribution during the chemical reaction of scrubbants and toxic pollutants within the gas-scrubber apparatus.

The prior art patents disclose various types of apparatus for gas scrubbing, but the major drawback is that there are too many inter-related components to properly perform the process functions on a routine basis, and the methods have very limited applications. The apparatus and methods disclosed for conversion of toxic gases to inert solids have come under scrutiny as to whether they are safety devices for environmentally controlling the toxic pollutants going into the atmosphere.

None of the prior art patents disclose a scrubbing apparatus having the capability of scrubbing a wide range of toxic chemical pollutants, or having an adsorption/absorption capacity and chemical reaction rate that provide an extremely high conversion efficiency, in the order of 99.999%. The prior art systems do not provide satisfactory alternatives in meeting federal and state standards for emission control where the safety control device functions 100% of the time to remove toxic gas pollutants from the gas carrier stream. The prior art does not disclose gas-scrubbing systems having the ability to scrub high volumes of contaminated air efficiently over an extended period of time at an economical cost.

DESCRIPTION OF PRIOR ART

Prior patents in this field have disclosed several methods for scrubbing and/or reacting of gases/liquids with the use of liquid and/or solid catalysts for the conversion of the gases or liquids into another converted/reacted form of liquid and/or solid by the use of varied types of scrubbers and/or reactors. More particularly, there are a few prior art methods that disclose the converting of trace amounts of toxic gases into reacted inert compounds. However, prior patents in this field have a number of drawbacks and have also failed to provide satisfactory results. For example, they do not control the flow or proper distribution of gases through the scrubbing system in an optimal manner, and they do not use baffles or convection pipes to control the heat distribution or optimize the flow of gases in contact with the scrubber catalyst in the gas-scrubber apparatus. Representative prior patents are as follows:

For example, U.S. Pat. No. 2,581,134 describes the apparatus in this patent as a reactor device for contacting solids with gases. This apparatus uses a number of baffles and annular members and spacing elements for solid-to-gas contact. This patent has no disclosure showing the type of catalyst or scrubbant being used in the apparatus; or cross-sectional isothermal flow; or a vertical heat gradient; or uniform heat distribution within the apparatus.

U.S. Pat. No. 2,717,202 describes the apparatus in this patent as a reactor device for contacting liquids with gases and is used for the hydrogenation of an oil, such as cotton seed oil. This apparatus uses a number of cylindrical baffles, conical baffles, concentric annular chambers, and gas inlet pipes for liquid-to-gas contact. This patent has no disclosure of uniform heat distribution within the reactor or of a vertical heat gradient or a cross-sectional isothermal flow.

U.S. Pat. No. 2,917,372 describes the apparatus in this patent as a liquid-gas contact reactor device. This type of reactor is used to produce dibasic aromatic acids by the oxidation of liquid xylenes by gaseous oxygen. This apparatus uses various baffle systems and a hollow shaft for gas transfer. This patent has no disclosure of uniform heat distribution within the reactor or of a vertical heat gradient or a cross-sectional isothermal gas flow.

U.S. Pat. No. 2,989,383 describes the apparatus in this patent as a liquid-to-solid adsorber device. This adsorber has a solid bed of permeable adsorbent material, typically comprising silica gel, activated alumina, or charcoal. This patent has no disclosure of baffle systems; piping for gas flow; uniform heat distribution within the adsorber; vertical heat gradient flow; or a cross-sectional isothermal gas flow.

U.S. Pat. No. 3,894,853 describes the apparatus in this patent as a gas-treating device used in conjunction with a blast furnace. This apparatus uses a conical baffle system with an annular trough for collecting water from the gas-cooling element flowing over the baffle. The annular trough discharges the collected water to a conduit and a secondary separator. This patent has no disclosure of uniform heat distribution within this gas-treating apparatus; a vertical heat gradient; a cross-sectional isothermal gas flow; or of a catalyst or scrubbant being used in this apparatus.

U.S. Pat. No. 3,900,537 describes the apparatus in this patent as a reactor-column for heat and mass exchange between a gas and a liquid. This device primarily is used for the oxidation of paraffin hydrocarbons in the production of synthetic fatty acids. This apparatus has transverse partitions (acts like a baffle), with holes which accommodate downflow pipes for the passage of liquid from the overlying transverse partition down to the underlying one. This patent has no disclosure of uniform heat distribution within this reactor column apparatus; a vertical heat gradient; a cross-sectional isothermal gas flow; or any catalyst or scrubbant being used in this apparatus.

U.S. Pat. No. 3,780,497 describes a method for adsorbing gaseous fluorine on alumina particles. The alumina particles are introduced at the base of an adsorption column through which the stream of gas with fluorine contaminants to be scrubbed flows. The column terminates in a separator where the particles with fluorine adsorbed are removed. This patent has no disclosure of uniform heat distribution within the scrubber apparatus; or of a vertical heat gradient; or of a cross-sectional isothermal gas flow.

U.S. Pat. No. 4,364,906 describes a method for selectively removing fluorine and fluorine containing contaminants from gaseous $UF_6$ by using calcium carbonate as a scrubbant source. Severe gas-flow conditions at a temperature range of 1000° F. are required for processing the removal contaminants. This patent has no disclosure of uniform heat distribution within the scrubber apparatus; or of a vertical heat gradient; or of a cross-sectional isothermal gas flow.

U.S. Pat. No. 4,065,271 discloses removing hydrogen fluoride from gases by introducing the gases into fluidized-bed reactor to form a gas-solid suspension, entraining a major part of solids in an upward direction, and requiring an additional apparatus for separating the solids entrained by the gases without prior removal of solids from the gas-solid suspension by means of an electrostatic precipitator. This patent has no disclosure of uniform heat distribution within the scrubber; or of a vertical heat gradient; or a cross-sectional isothermal gas flow.

U.S. Pat. No. 5,086,831 describes the apparatus in this patent as an oxidation device that uses a catalyst for transforming harmful hydrocarbon gases into environmentally-safe gas components. This device has a thermal energy return arrangement of heat tubes in a multistage arrangement, which transversely extend through gas ducts. This device shows the size ratio of the heat-exchanging surfaces of heating part to cooling part, in such a way that the operating temperature in the interior of the heat tube is increased and is substantially raised close to the higher gas temperature. As a result of this measure, the temperature of the tube walls of the critical heat tube sections to which the carrier gas is admitted is increased. Since the temperature is completely uniformly distributed over the length of the heat tubes, the heat tubes also contribute to the optimum utilization of the properties of the catalyst. Locations having a higher gas temperature reach a higher degree of conversion than locations with a lower gas temperature. This patent also has no disclosure of cross-sectional isothermal gas flow nor of any type of baffle systems or scrubbants being used.

U.S. Pat. No. 4,615,870 describes a reactor device for the hydrotreating of hydrocarbons in the presence of finely-divided solids and typically finely-divided catalysts. This apparatus has multiple baffle systems comprising a hooded internal baffle, a frusto-conical baffle, a sloping annular baffle, and a centrally-disposed conical baffle. The baffles cooperate to provide a "disc and donut" baffling action for fluid within the vessel. The apparatus also includes a gas inlet means comprising an inlet located in the bottom head and a gas plenum within the bottom head. This patent has no disclosure of uniform heat distribution within this reactor device; or of a vertical heat gradient; or of a cross-sectional isothermal gas flow.

OBJECTS OF THE INVENTION

The general object of the present invention is to provide a new and improved gas-scrubber apparatus and method for the conversion of toxic gaseous compounds into inert non-hazardous solids to be used as an environmental safety device for emission control.

It is also an object of the present invention to provide a self-dynamic condition for mixing of the pollutant gases by using an internal perimeter ring with an angular baffle, and for the transfer of the hot toxic gases by thermo-convection pipes which provides a uniform temperature or heat distribution within the gas-scrubber apparatus.

Another object of the present invention is to provide internal perimeter rings with angular baffles which act as an interrupter to the superficial path of the hot-gas stream and also act as a temporary catcher of the hot gases from the angular baffle in order to divert or channel the hot gases inwardly to the center of the gas scrubber.

It is a further object of the present invention to provide thermo-convection pipes which allow the hot gases to flow from the angular baffle through the thermo-convection pipes where the hot gases are then directed inwardly to the center or the internal core section of the gas scrubber.

It is a further object of the present invention to provide a system which allows the handling of a high volumetric flow of hot gases through the gas-scrubbing system without the need for filtration or dust collection units as part of the system.

It is a further object of the present invention to provide a system having flow rates of the influent pollutant gaseous stream varied from 0.03 to 3.0 ft per second for the gas velocity rates.

It is a further object of the present invention to provide a method and apparatus for scrubbing a wide range of toxic gaseous contaminants.

It is a further object of the present invention to provide a method for a gas-scrubbing system using a multi-mixture of gas-scrubbant materials which allow total adsorption and/or absorption in a chemical reaction with incoming hot toxic gases, resulting in an effluent gas stream containing less than ten parts per billion (10.0 ppb) of the original gaseous pollutants.

It is a further object of the present invention to provide for recycling and/or reprocessing and reusing the consumable gas scrubbant materials when the scrubbing operation has been completed by recycling the spent scrubbant for landfill, as it is not a hazardous waste; or by sending it back to the scrubbant manufacturer for reprocessing for use again.

It is a further object of the present invention to provide a method for a gas-scrubber apparatus wherein the unreacted (raw) scrubbant materials and that of the spent (reacted) residual scrubbant materials are very similar in bulk densities, so there is no need for any critical design considerations for the gas-scrubber apparatus.

It is a further object of the present invention to provide a method for a gas-scrubber apparatus which uses consumable scrubbant materials that do not require any scrubbant activation procedure for the removal of various gaseous pollutants in the gas stream.

It is a further object of the present invention to provide a method for a gas-scrubbing system, such that operational costs are minimized by using inexpensive and recyclable scrubbant materials, and the operational conditions within the system require only moderate temperatures and pressures for the gas scrubbing which result in a low total operating cost.

It is a still further object of the present invention to provide a gas-scrubbing system which is virtually free of moving mechanical parts, which makes the operational system easy to clean, easy to maintain, easy to repair or replace worn parts, thereby reducing the operating costs for the system.

SUMMARY OF THE INVENTION

This invention relates to a gas-scrubber apparatus and method for the removal of toxic gaseous chemicals from venting sources, such as in chemical processing areas, batch-process evacuation, or building ventilation. The scrubber of the invention may be used in a number of industries, including the pharmaceutical, semiconductor, specialty chemical, power generation, and electroplating industries, to name a few. The present gas-scrubbing system is a functional environmental control device which meets all federal and state emission guidelines for conversion efficiency and safety. The scrubber apparatus of the present invention is suitable for scrubbing a number of different toxic gases in a single operation.

In addition, the gas-scrubber apparatus has self-dynamic gas-mixing components, including thermoconvection pipes and internal perimeter rings with angular baffles, which maintain a substantially uniform heat distribution in a horizontal direction across the reaction zone of the scrubber and a temperature gradient in a vertical direction. The present invention provides a gas-scrubber apparatus in which the toxic gaseous stream to be scrubbed passes through the solid bed of scrubbant materials, and the reacted pollutants are converted to non-hazardous inert solid chemical compounds. These inert solids and the spent scrubbant material can be readily used in landfills or can be recycled and reprocessed again as active scrubbants.

The solid scrubbant materials include chemical radicals, such as hydroxides, oxides, carbonates, and bicarbonates used for the scrubbing operation, wherein the scrubbants chemically react with the pollutants.

The chemical kinetics of the reaction, the thermochemistry involving the heat of reaction, the heat of solution, and the heat transfer are all parameters involved in the scrubbing reaction of the present invention. Experimental information is needed for the chemical kinetics of the reaction involving adsorption/absorption and the chemical rate of the reaction between the scrubbants and pollutants, which are converted to an inert solid. The efficiency of the scrubbing operation is dependent on the efficiency of the adsorption/absorption, the rate of reaction, and the efficiency of the conversion capacity of the solid scrubbant.

The present invention provides a mixture of two or more solid-scrubbant compounds which induce the formation of a scrubbant complex that increases the adsorption/absorption efficiency of the scrubbant complex as compared to a pure single solid scrubbant. The rate of reaction of the scrubbant complex is faster than the rate of reaction of a pure single scrubbant. In addition, the scrubbant complex multi-reacts with the pollutants as compared to the pure single scrubbant that reacts only molecule to molecule. The scrubbant complex has several times more capacity to adsorb/absorb gaseous pollutant molecules as compared to a pure single scrubbant compound. The complexes of scrubbants are a combination of the aforementioned inorganic oxides, hydroxides, carbonates, and bicarbonates that inter-exchange their chemical ions in a metathesis reaction with the pollutant gases to form a most stable and inert compound.

The thermochemistry and the chemical kinetics of the reaction between the inorganic mineral scrubbants and water and/or toxic chemicals, such as acids, is exothermic. Chemical information about the heat of reaction and the heat of solution help to determine if the toxic gaseous mixture has to be heated or cooled and if the gas-scrubber apparatus has to be heated or cooled. In cases where the concentration of the toxic gaseous mixture is lower than (1%) one percent, the gaseous mixture and the gas scrubber have to be heated. For toxic gaseous mixtures with higher percentage concentrations of pollutants, an energy balance has to be calculated in order to establish the proper design criteria for the gas-scrubber apparatus.

The rate of reaction within the solid bed of scrubbants for a gas scrubber apparatus of this type is a first order reaction and can be defined by the following equation:

$$dC/dt = kC$$

$$t = \frac{1}{k_s} \ln\left[\frac{2C_i - C_f}{C_f}\right]$$

$$t = \frac{1}{k_1 X_s} \ln\left[\frac{2C_i - C_f}{C_f}\right]$$

$$K_1 = K_o \left(\frac{T + 273° \text{ C.}}{273° \text{ C.}}\right)^z$$

$C_i$ = initial concentration in ppm by volume of the gaseous mixture
$C_f$ = final concentration in ppm by volume of the gaseous mixture
$K_s$ = equilibrium constant
$K_o$ = equilibrium constant at 0° C.
$K_1$ = equilibrium constant at reaction temperature T ° C.
$X_s$ = weight fraction of active solid scrubbant
$t$ = retention time in seconds
$T$ = reaction temperature in ° C.
$Z$ = exponent function of solid gas system The controlling factor in the rate of reaction is the solid active fraction, the temperature of the solid, the temperature of the gaseous mixture, the dynamic of the gas phase (mass transfer rate of diffusion), and the gradient of the concentration of the pollutant to be scrubbed, such as hydrogen fluoride.

The present invention provides uniform heat distribution and optimal gas flow within the gas scrubber by having a cross-sectional isothermal condition in a horizontal cross section across the scrubber and by having a vertical temperature gradient (a lower temperature zone to a higher temperature zone), extending from the bottom to the top of the solid bed of scrubbant complexes. The present invention provides two non-moving, mechanical units which achieve the cross-sectional isothermal condition and the vertical temperature gradient within the interior portion of the gas-scrubber apparatus. The first unit is an internal perimeter ring with an angular baffle, which acts as an interrupter to the superficial path of the toxic gaseous stream and also acts as a temporary collector of the hot toxic gases from the angular baffle. The present invention has a plurality of these internal perimeter rings with angular baffles which operate to divert and guide the hot toxic gases away from the wall area and inwardly to the center core of the gas scrubber apparatus. The second unit includes thermo-convection pipes which allow the hot toxic gases to flow from the angular baffles through the thermo-convection pipes where the hot toxic gases are then guided inwardly to the center core area of the gas scrubber. In having these two units in the present invention, the hot toxic gases are in a self-dynamic condition of mixing and gas flow, and this controls the uniform temperature or heat distribution along a horizontal cross section inside the gas scrubber apparatus and the vertical temperature gradient, which are essential aspects of the present invention.

The circulation of the hot toxic gases in the mixing mode helps the conversion of the pollutant gases to the inert solid within the solid bed of the scrubbant complex. The hot gases flowing from the inside surface wall of the scrubber through the thermo-convection pipes transfer the build up of heat from the area of the inside surface wall to the center core area of the solid bed of scrubbants within the gas scrubber, which provides the uniform or isothermal heat distribution in a horizontal direction and the vertical temperature gradient which contributes to a faster rate of reaction. An approximate one-third of the total gas flow circulates contiguous to the inside wall surface of the scrubber vessel and is forced to flow back to the center core body of the solid bed of scrubbants by way of the interior perimeter rings with angular baffles and the thermo-convection pipes of the present invention. The total amount of heat transferred by thermo-convection and thermo-conduction is defined by the following equation:

$$Q = F/3(G)(c)(T-t)$$

Q=heat transfer from surface to the solid bed BTU/h
F=gas flow rate (blower capacity) cfh
G=gas density lbs/cf
c=heat capacity of the gas BTU/lb-degree ° F.
T=surface temperature ° F.
t=solid temperature ° F.

In summary, the gas-scrubbing system has five major components. These major components include the following:

1) A silencer apparatus which is used for the quieting of the noise level from the incoming toxic gaseous stream;
2) A gas-blower apparatus capable of delivering high-volumetric rates of air with the toxic gaseous pollutant in the carrier stream;
3) A gas-heating system capable of producing moderate heating temperatures, which elevates the gas stream from room temperature to a discharge gas-flow temperature higher than 200° F.;
4) A gas-scrubber apparatus for the conversion of pollutant gases to inert solid compounds where the material of construction for the vessel is typically stainless steel, monel, inconel, or carbon steel; and
5) An exit (outlet) gas emission stack for the releasing of the clean air into the atmosphere.

The only moving mechanical parts in the gas-scrubbing system are in the gas blower apparatus. There are no moving parts in the gas-scrubber apparatus which makes the entire system easy to clean and easy to operate and maintain, with only minor monthly maintenance needed.

The entire system uses a minimal amount of electrical power to maintain the mechanical and heat energy needed for the operation of the gas-blower apparatus, gas-heater system, and gas-scrubber apparatus, affording a low cost and economical operation for the disposing of gaseous toxic pollutants.

The only other operating expense (other than electrical and manpower) is the cost of the scrubbant complexes used in the gas-scrubber apparatus. That expense is minimized and offset by the ability of the system to produce an inert solid which can be used in landfill because it is not a hazardous waste product. Alternatively, the spent (reacted) scrubbant can be sold back to the manufacturer where it is recycled, reprocessed and reused again as an active scrubbant compound. This also minimizes the ongoing operating expense of the gas-scrubbing system, thus providing a very attractive and economical system for keeping the environment clean.

BRIEF DESCRIPTION OF THE DRAWINGS

Further objects, features, and advantages of the present invention will become apparent upon the consideration of the following detailed description of the presently-preferred embodiment when taken in conjunction with the accompanying drawings, wherein.

DETAILED DESCRIPTION OF THE PREFERRED EMBODIMENT

Figure 1:
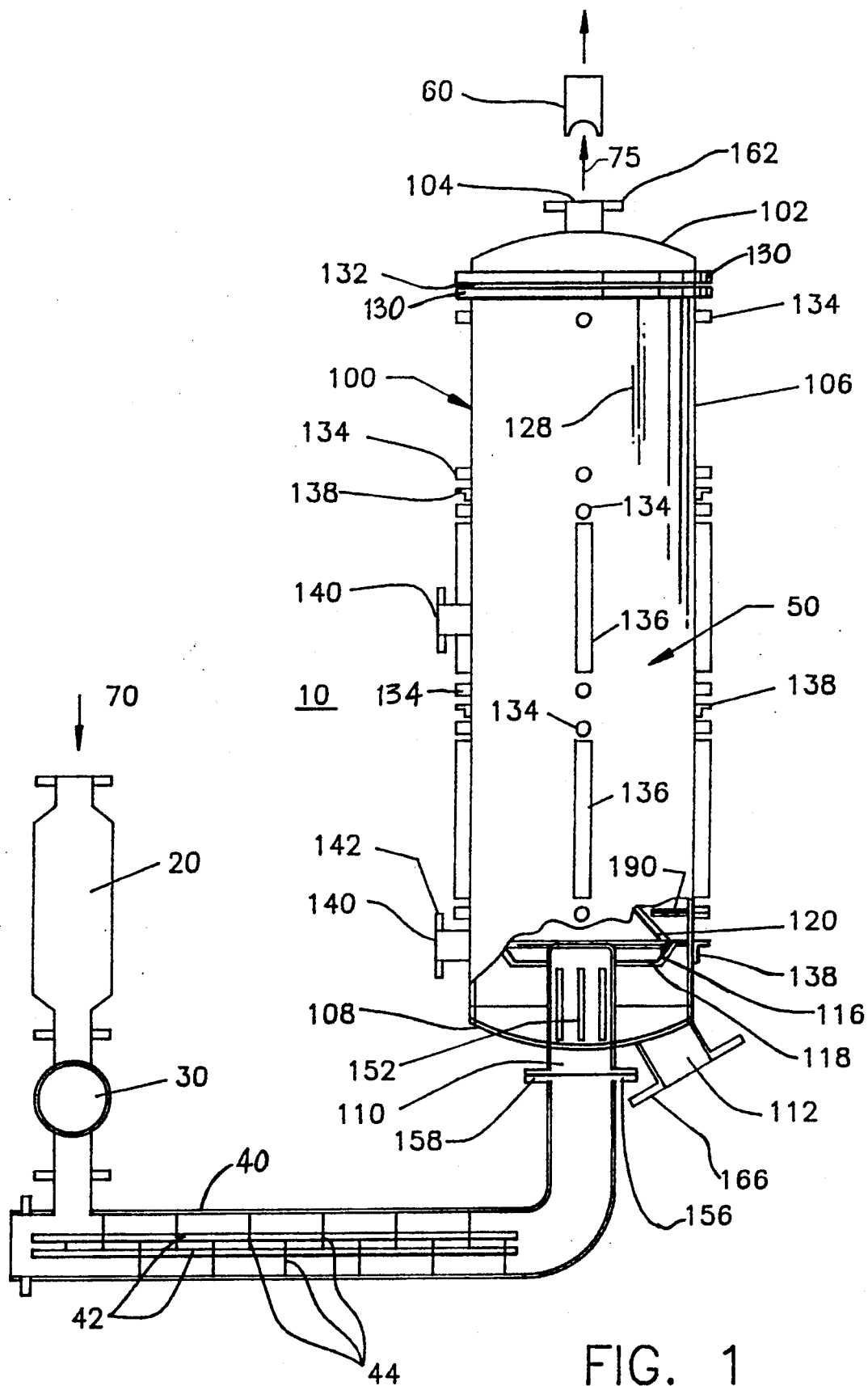
FIG. 1 is a side view schematic of the present invention of the gas-scrubbing system with all major components being shown.

FIG. 1 depicts the gas-scrubber system 10, including the universal gas-scrubber apparatus 50, which reduces the trace quantities of toxic gases and pollutants in the air stream to essentially zero (reduction in the range of 99.99% to 99.999%). As shown in FIG. 1, the gas-scrubber system 10 includes a silencer component 20, a gas blower 30, a gas-heater system 40, the universal gas-scrubber apparatus 50, and an outlet gas stack 60, which provides a clean gas effluent 70 to the atmosphere.

Figures 2A, 2B:
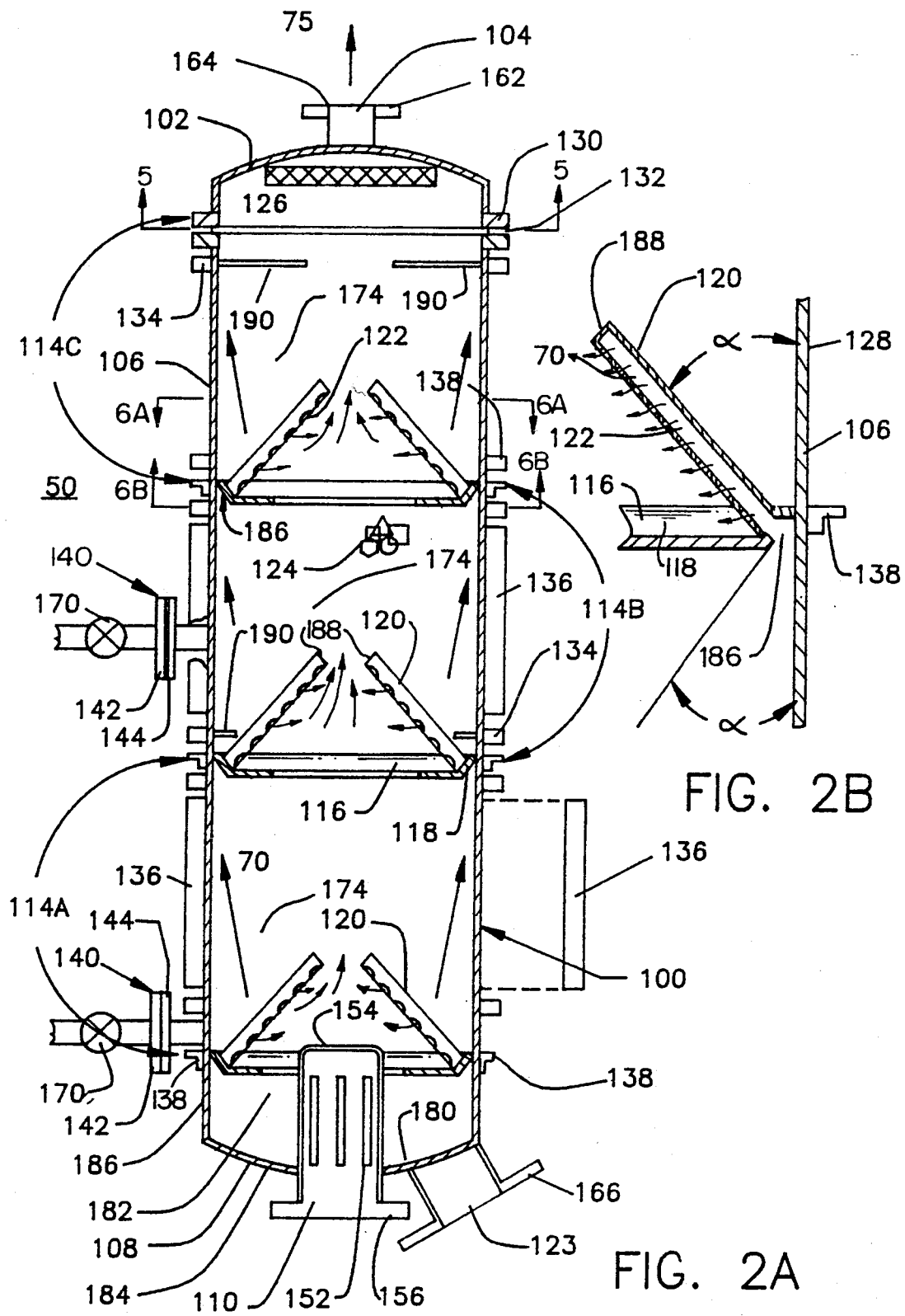
FIG. 2A is a cross-sectional view of the present invention of the gas-scrubber apparatus with all major components being shown, including the internal perimeter rings with angular baffles, thermo-convection pipes, and the inlet sparger assembly.
FIG. 2B is an enlarged vertical cross-sectional view of the present invention showing the thermo-convection pipe and internal perimeter ring with angular baffle.
Figure 3:
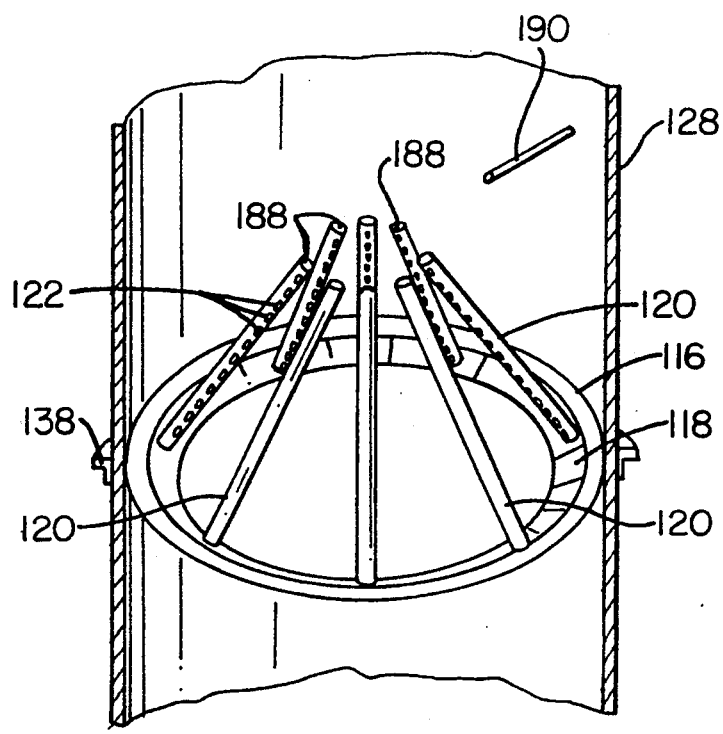
FIG. 3 is a vertical sectional view shown in perspective of the gas-scrubber apparatus of the present invention having portions of some of the components thereby partially broken away.

FIGS. 2 and 3 depict the universal gas-scrubber apparatus 50 in detail, including all of its component parts. The gas-scrubber apparatus 50 includes an outer cylindrical stainless steel housing 100 having a top cover member 102 with an outlet port 104, a vertical cylindrical wall member 106, and a bottom cap member 108, having both an inlet sparger assembly 110 and a drain connection component 112. Internally, the gas-scrubber apparatus 50 has a plurality of scrubber assemblies 114, each having an internal perimeter ring 116 and an angular baffle 118, a plurality of thermo-convection pipes 120 for gas mixing, which have a plurality of perforations or openings 122 formed therein, and consumable scrubbant materials 124 for reacting with the pollutant or contaminated gases. Although, there are three scrubber assemblies 114 shown in this embodiment, as depicted in FIGS. 2 and 3, different numbers of scrubber assemblies 114 may be employed, depending upon the following major factors: volumetric flow of contaminant gases in pounds per cubic feet per hour (lbs/ft$^3$/hr); volumetric capacity of the gas scrubber 50 in cubic feet (ft$^3$), which is directly related to the weight of scrubbants 124 within the gas scrubber's 50 volumetric space; and the efficiency of clean gas 70 needed (99.9% versus 99.999%). The above factors relate to how many scrubbant assemblies 114 are needed, which can be any number.

The top cover member 102 has a permanently-attached (welded) outlet port 104 that is centrally located on the convex surface of cover member 102. Attached to the outlet port 104 is the outlet gas stack 60, which releases the cleaned or scrubbed air 70 to the atmosphere. Top cover 102 and outlet port 104 are connected by two circular stub end lap joint flanges (6 inch diameter) 162 and a circular flange gasket (6 inch diameter) 164, which is placed between the two flanges 162 to prevent any air or gas leakage at that joint. Within the concave portion of the top cover member 102 (under the top cover cap), there is a reusable and centrally-located internal circular wire mesh air filter 126 for filtering out from clean gas 70 any spent scrubbant 124 before it passes into the atmosphere. The top cover member 102 is attached to the top section of the vertical cylindrical wall member 106 by connecting two circular slip-on stub end flanges (36 inch diameter) 130 and a circular flange gasket (36 inch diameter) 132, which is placed between the two flanges 130 to prevent any gas leakage at that joint.

Attached to the outside surface area 128 of vertical wall member 106 are the following gas scrubber 50 component parts: one side of the circular slip-on stub end flange 130; a plurality of thermo-couple sensors 134; a plurality of vertical electrical heating-element strips 136; a series of external ring reenforcement flanges 138; and a series of external ports 140 for pressure-release valves 170.

The thermo-couple sensors 134 measure the temperature of the gaseous mixture within the scrubbant assemblies 114. These temperature sensors 134 are located above and below each heating element strip 136 on the outside of vertical wall member 106. There are approximately sixteen thermo-couple sensors 134 for each scrubber assembly 114.

The vertical electrical heating-element strips 136 provide heating energy to the already-heated hot gases 70 within scrubbant assemblies 114. The heating energy provided by the heating element strips 136 is used to maintain predetermined levels of hot temperatures within each assembly 114. The different assemblies 114 have correspondingly-different temperature gradients of the hot gaseous mixture within each scrubber assembly 114.

The plurality of vertical electrical heating element strips 136 is equally spaced and mounted centrally on the outside surface area 128 of wall member 106 adjacent each scrubber assembly 114, as depicted in detail in FIGS. 2 and 3. There may be several rows of heating-element strips 136, which are mounted on the (outside) exterior surface area 128 of wall member 106. There are approximately eight vertical heating-element strips 136 for each scrubber assembly 114.

There are a series of external ring reinforcements 138 which are physical support members for the internal perimeter rings 116, having angular baffles 118 of each scrubber assembly 114 within the gas scrubber 50. The external ring reinforcement support members 138 are permanently mounted on the exterior surface 128 of wall member 106 but within the lower section of each scrubber assembly 114, as depicted in detail by FIGS. 2 and 3. There may be several rows of reinforcement support members 138, depending upon the number of assemblies 114 that are in the gas scrubber 50. For the embodiment shown, there are three external ring re-enforcement support members 138 for gas scrubber 50.

There are a series of external outlet ports 140 used in conjunction with pressure-release valves 170 which provide a means of pressure relief for when the contaminated hot gaseous mixture within an individual scrubbant assembly 114 exceeds the pressure limit in pounds per square inch (psi) that is prescribed and set for the gas scrubber 50. The external outlet port(s) 140 are permanently mounted on the exterior surface 128 of wall member 106 but within each scrubber assembly 114, as depicted in detail by FIG. 3 of the present embodiment. The lowermost external outlet port 140A is situated slightly above the lowermost external ring re-enforcement support member 138, while external outlet port 140B is centrally located relative to scrubber assembly 114B. It should be noted that other external outlet ports 140C, 140D, etc. (not shown), are centrally located within the assembly 114 on exterior surface 128 of wall member 106. In the present embodiment, there are two external outlet ports 140A and 140B. The external outlet ports 140A and 140B are jointly attached to corresponding pressure-release valves 170 by connecting the two circular stub-end lap joint flanges (2" diameter) 142 and a circular flange gasket (2" diameter) 144, which is placed between the two flanges 142 to prevent any contaminated gaseous leakage from that joint to the atmosphere.

Attached to the inside (interior) surface area 172 of wall member 106 and within the interior chamber area 174 of housing 100 are the following gas scrubber 50 components parts: a series of internal perimeter rings 116 having angular baffles 118 attached thereto; a plurality of thermo-convection pipes (gas mixer) 120 for gaseous mixing having a plurality of perforations 122 formed therein; and a pre-determined quantity of consumable gas scrubbant materials 124.

The internal perimeter rings 116, having angular baffles 118, provide a means for collecting and guiding the hot contaminated gaseous mixture 70 adjacent the wall area 106 into the bundle of thermo-convection pipes 120, which direct the hot contaminated gaseous mixture 70 from the wall area 106 to the center core of interior chamber area 174. The perimeter ring 116 with angular baffle 118 act as an interrupter to the superficial path of the hot-gas stream 70 and also as a temporary collector of the hot gases 70. These permanently-attached internal perimeter rings 116 with angular baffles 118 are located in the lower section of each scrubber assembly 114, as depicted in detail in FIGS. 2 and 3. The internal perimeter ring 116 with angular baffle 118 are permanently mounted on the interior surface 172 of wall member 106. There may be several spaced-apart rows of perimeter rings 116 with angular baffle 118 corresponding to the number of scrubber assemblies 114 that are in the gas scrubber 50. In this embodiment, there are three internal perimeter rings 116 with angular baffles 118 corresponding to the three scrubber assemblies 114. A perimeter ring 116 with angular baffle 118 is spaced between each of the assemblies 114 at a distance of one to four housing radii.

Figure 4:
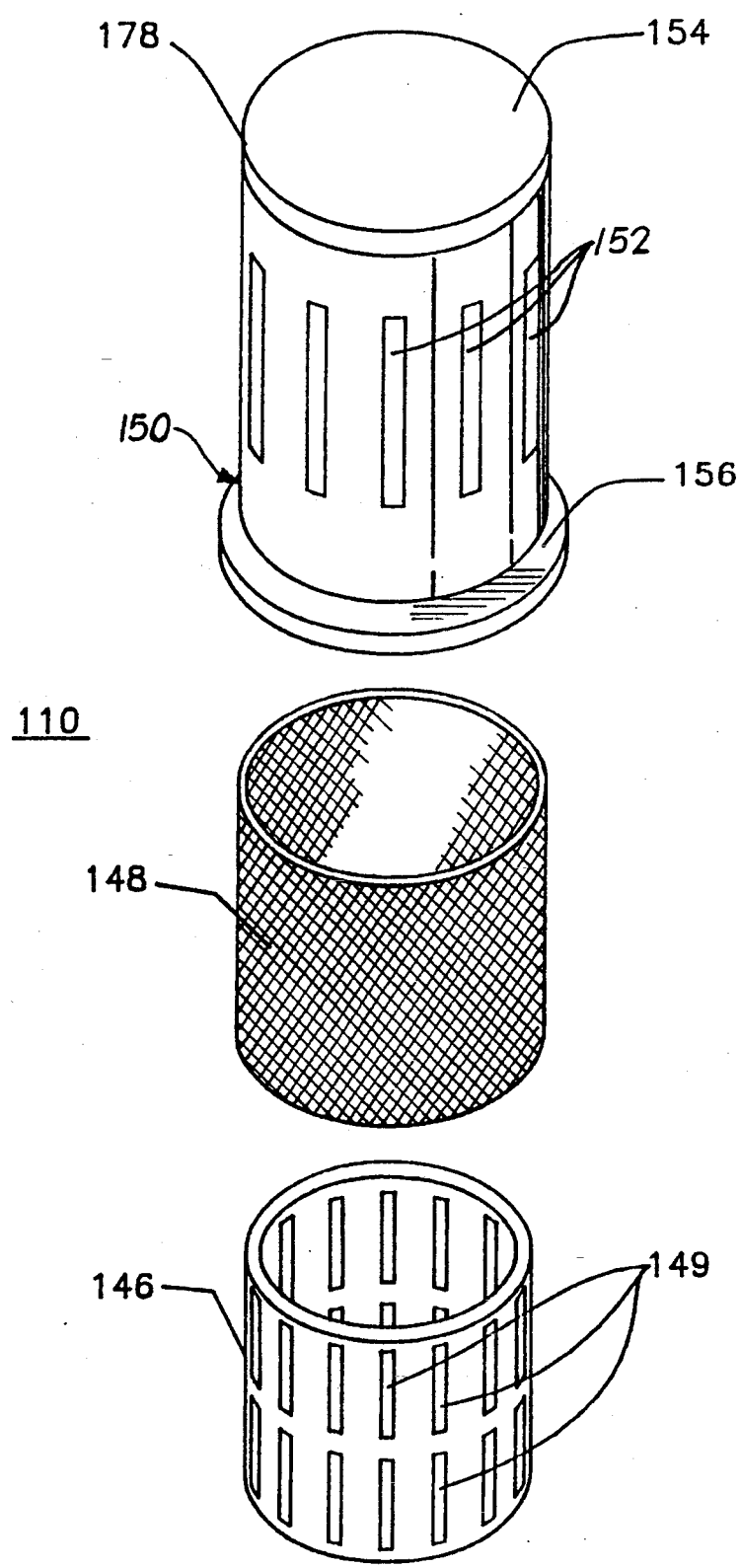
FIG. 4 is an enlarged exploded perspective view looking from the bottom upward of the present invention showing the inlet sparger assembly having portions of all of the component parts partially broken away.

There is a plurality of internal thermo-convection pipes 120 used in conjunction with the internal perimeter rings 116 and angular baffles 118, which provide the means for guiding and redistributing the hot contaminated gaseous mixture 70 through the pipe openings 176, which then exit through the perforations 122. This internal arrangement of pipe bundles 120 operates to keep the hot contaminated gaseous mixture 70 uniformly distributed in a horizontal direction across the housing 100 from wall to wall, so there is a substantially isothermal condition. The hot contaminated gases 70 that have a tendency to accumulate between the interior wall surface 172 of wall member 106 and the angled baffle 118 where then the gases 70 are directed by thermo-convection pipes 120 to the center core of chamber 174 of scrubber 50. This re-distributes the heat to keep a uniform or isothermal cross-sectional temperature distribution in a horizontal direction across the solid scrubbant mass 124 although the temperature increases in a vertical direction. The bundle of pipes 120 is mounted on the top surface of internal perimeter rings 116 and is angled inwardly and upwardly toward the center core of interior chamber 174. The individual pipes 120 are equally spaced on the perimeter ring 116 with angular baffle 118 at a distance in the range of approximately 0.2 to 2 radii of housing 100. The thermo-convection pipes 120 are angled inwardly at an angle alpha ($\alpha$) from the interior wall surface 172 of wall member 106, as shown in FIGS. 3 and 4. The thermo-convection pipes 120 may be at an angle from 15° to 75° in range, but preferably from 30° to 60° is the norm.

In use, the length of the thermo-convection pipe(s) 120 is approximately 1 radius of housing 100, with the inner or unattached end of pipe 120 being about 1 radius distance away from the interior wall surface 172 of wall member 106. The size of the diameter ($d_{tc}$) of the thermo-convection pipe(s) is dependent upon the diameter ($D_s$) of the scrubber-discharge outlet port 104 and the number (n) of thermo-convection pipes 120 in one internal perimeter ring 116. The diameter ($d_{tc}$) for the thermo-convection pipes 120 can be calculated by the following formula:

$$d_{tc} = D_s \cdot \sqrt{2/n}$$

Based upon this particular embodiment, the diameter ($d_{tc}$) of thermo-convection pipes 120 would be as follows where:

$d_{tc}$ = diameter of the thermo-convection pipes.
$D_s$ = diameter of the scrubber discharge equals 6 inches.
n = number of thermo-convection pipes in one perimeter ring equals eight.

Thus, $$d_{tc} = 6 \text{ inches} \cdot \sqrt{2/8} = 6 \text{ inches} \cdot \sqrt{0.25}$$

$$d_{tc} = 6 \text{ inches} \times 0.5 = 3 \text{ inches}$$

The calculation indicates the diameter ($d_{tc}$) of thermo-convection pipes 120 in this embodiment would be equal to a 3-inch diameter.

The bundle of pipes 20 is centrally located within each scrubbant assembly 114, as depicted in detail in FIGS. 2, 3, 4, 5, and 6. There may be several spaced-apart rows of these thermo-convection pipe bundles 120 corresponding to the number of assemblies 114 that are in gas scrubber 50. In this particular embodiment, there are three rows of pipe bundles, totaling (3×8) twenty-four thermo-convection pipes 120 corresponding to the three assemblies 114.

The interior of the housing 100 defines a reaction zone 174, which is packed with a solid bed of consumable gas-scrubbant materials 124. The scrubbant materials 124 operate to remove pollutants and toxic compounds from the gas stream 70 by a chemical reaction in which the pollutants and toxic compounds become a nonhazardous chemical compound in the form of an inert solid metal salt(s) or metal complexes. The scrubbant materials 124 are usually solid chemical compounds, including metal oxides, hydroxides, bicarbonates, and carbonates. The efficiency of the gas-scrubbing operation is dependent upon the efficiency of the adsorption/absorption of the scrubbant materials 124 and the efficiency of the chemical reaction between the gas-scrubbant materials 124 and the toxic gases in the gas stream. The presence of a mixture of two or more solid scrubbant compounds in scrubbant materials 124 with metal complexes increases the efficiency of their adsorption/absorption and their chemical reaction with the toxic gases and pollutants 70 by providing two or more groups of solid metal, complex scrubbant particles that have a combined affinity for the gaseous pollutants 70. These solid metal, complex scrubbant particles act as a type of trap that removes and scrubs the gaseous contaminants from the carrier gas stream 70. The combination of several different types of solid scrubbant materials 124 allows the scrubbing system 10, by way of gas-scrubber apparatus 50, to scrub more than one contaminant and up to several contaminants at a time in the gas stream 70 and reduces them to nearly a zero emission out of gas stack 60. Examples of such solid gas-scrubbant materials 124 are as follows: aluminum oxide, calcium carbonate, sodium bicarbonate, potassium bicarbonate, chromium oxide, ferric oxide, phosphoric acid, calcium sulphate, magnesium oxide, cobalt oxide, and carbon. The size of solid particulates in the scrubbant materials 124 can vary in the range of 6 millimeters (6 mm)/one-fourth of an inch (0.25 inch) to 100 millimeters (100 mm)/to almost 4 inches (4 inches) in diameter. The mesh equivalents are 100 mesh/0.15 mm/0.006 inch to 14 mesh/1.4 mm/0.055 inch in. diameter. The preferred range is approximately 14 mesh/1.4 mm/0.055 inch to 3 mesh/6 mm/0.25 inch in diameter of scrubbant particle size. The actual weight of solid-scrubbant materials 124 used is dependent upon the number of scrubbant assemblies 114 within the interior chamber 174 of scrubber apparatus 50, which provides a total internal volume capacity in cubic feet ($ft^3$) and a density in pounds per cubic feet ($lbs/ft^3$), which is a function of the particulate size. Therefore, the volume capacity ($ft^3$) of the interior chamber area 174 times the density ($lb/ft^3$) equals the total weight in pounds (lbs) of solid-scrubbant materials 124 to be used in reaction zone 174 for operation of the scrubbing system 10.

It should be understood that the number of scrubber assemblies 114 is dependent upon the particulate size and density of scrubbant materials 124. The number of assemblies 114 for the interior chamber 174 is equal to the total height (ft) of the solid bed of scrubbant materials 124 divided by the height (ft) of one scrubber assembly 114. The height in feet (ft) of one scrubber assembly 114 may be approximately from one radius to about five radii of the housing 100 radius. In most process applications, the height of one scrubber assembly 114 is equal to about two radii of housing 100. The height of a given scrubber assembly 114 is a function of the particulate size of scrubbant materials 124 used, the concentration of pollutants in the gas stream 70, the linear velocity of the gas 70 in feet per second (ft/sec), the pressure in pounds per square inch (psi) of the gas-scrubber system 10, and the temperature in degrees Fahrenheit (° F.) of the gas-scrubber system 10.

The bottom cap member 108 includes an inlet sparger assembly 110 and a drain outlet 112, both of which are permanently attached by welding to the convex surface 184 of cap member 108. Also, the bottom cap member 108 has permanently attached by welding a leg support structure 159, as shown in FIGS. 7 and 8, consisting of four support legs 160 having base pads 161 for the gas-scrubber apparatus 50, which are equally spaced and of equal height.

As shown in FIGS. 2 and 3, the inlet sparger assembly 110 is centrally mounted in the convex surface 184 of bottom cap member 108 and extends inwardly to the center core of interior chamber 174. The inlet sparger assembly 110 has a gas-distributor component 150 used for initial transfer of the hot gases 70 through the interior area of the bottom cap member 108. The inlet sparger assembly 110 includes the following components: an inner core, vertical and cylindrical pipe 146 having a plurality of vertical gas intake slits 149 therein; a middle core filter 148 of Godloe wire mesh, which acts as a particulate filter for the incoming hot gaseous stream 70; an outer vertical cylindrical gas-distributor pipe 150 having a plurality of vertical gas-exiting slits 152; and a circular top cover plate member 154. The top cover plate 154 is permanently attached by welding to the top upper circular edge 178 of the gas-distributor pipe 150. As shown in FIG. 9, the middle core filter 148 is then inserted into the center core of the gas-distributor pipe 150, and the inner core pipe 146 is then placed into the center core of the middle core filter 148. Essentially, the inlet sparger assembly 110 nests the components, whereas the inner core pipe 146 is surrounded by middle core filter 148 and nests therein, and the middle core filter 148 is surrounded by the outer gas-distributor pipe 150 and also nests therein. The plurality of vertical gas-discharge slits 152 provides for the transfer of the hot gaseous stream 70 into the center interior area of the bottom cap member 108. The vertical gas-discharge slits 152 extend from near the bottom of inside surface area 180 upward to a point that is almost parallel to the bottom baffle edge 182 of the lowermost internal perimeter ring 116, as depicted in detail by FIG. 2. The aforementioned inlet sparger assembly 110 and gas-heater system 40 are physically connected by two circular stub-end lap joint flanges (8 inch diameter) 156 and a circular flange gasket (8 inch diameter) 158, which is placed between the two flanges 156 to prevent any of the hot contaminated gases 70 from leaking at that joint.

Figure 5:
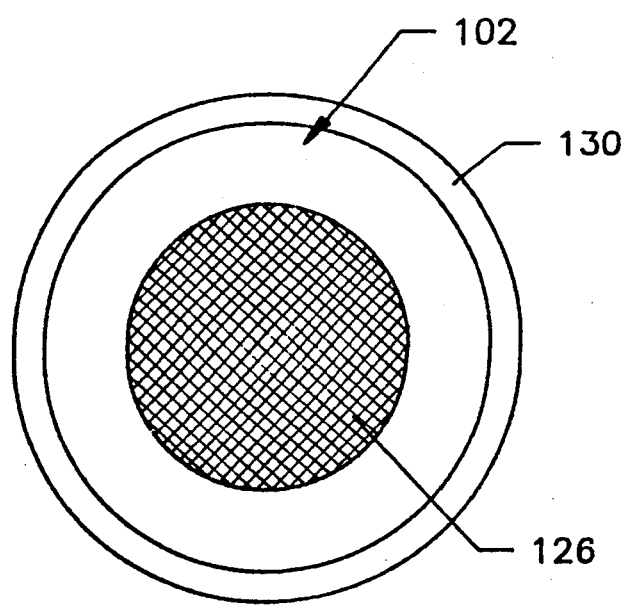
FIG. 5 is a top plan view of the present invention showing the top cover and wire mesh air filter of the gas scrubber.
Figure 6A:
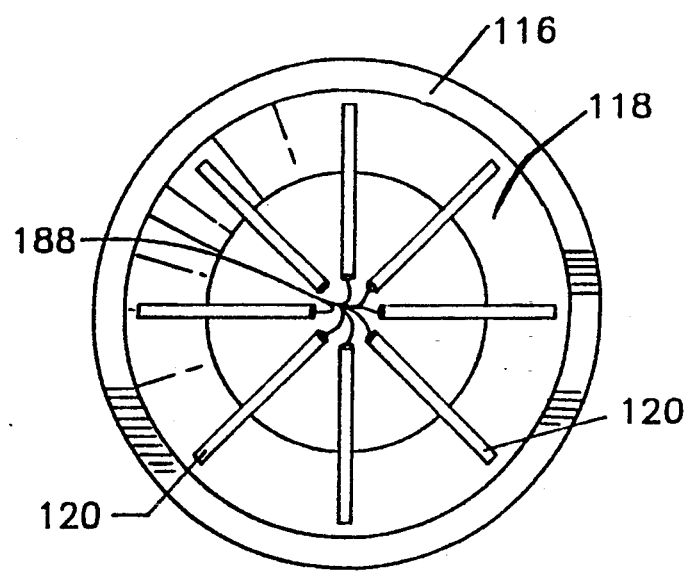
FIG. 6A is a top sectional view of the present invention taken along section line 6A—6A of FIG. 2A illustrating in detail the thermo-convection pipes and internal perimeter ring with the angular baffle.
Figure 6B:
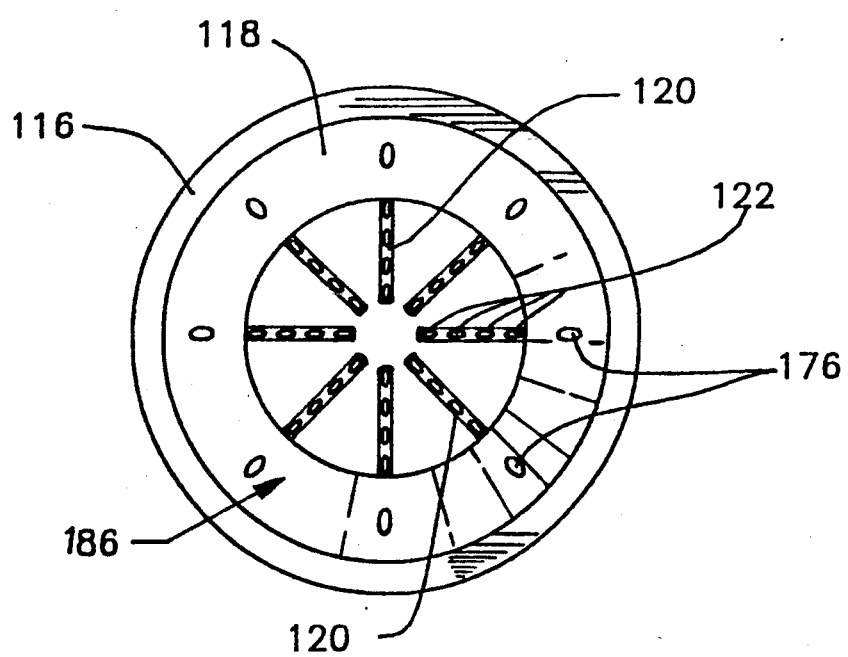
FIG. 6B is a bottom sectional view of the present invention taken along section line 6B—6B of FIG. 2A illustrating in detail the thermo-convection pipes and internal perimeter ring with the angular baffle.
Figure 7:
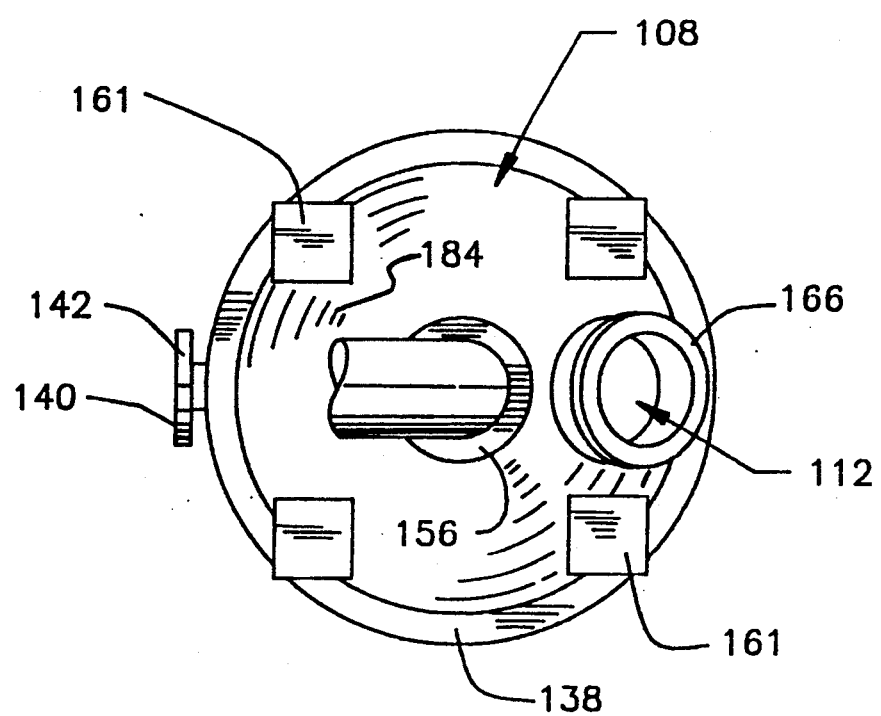
FIG. 7 is a bottom plan view of the present invention showing the bottom cap, including components of the inlet sparger assembly, drain connection, and base pads of support legs.
Figure 8:
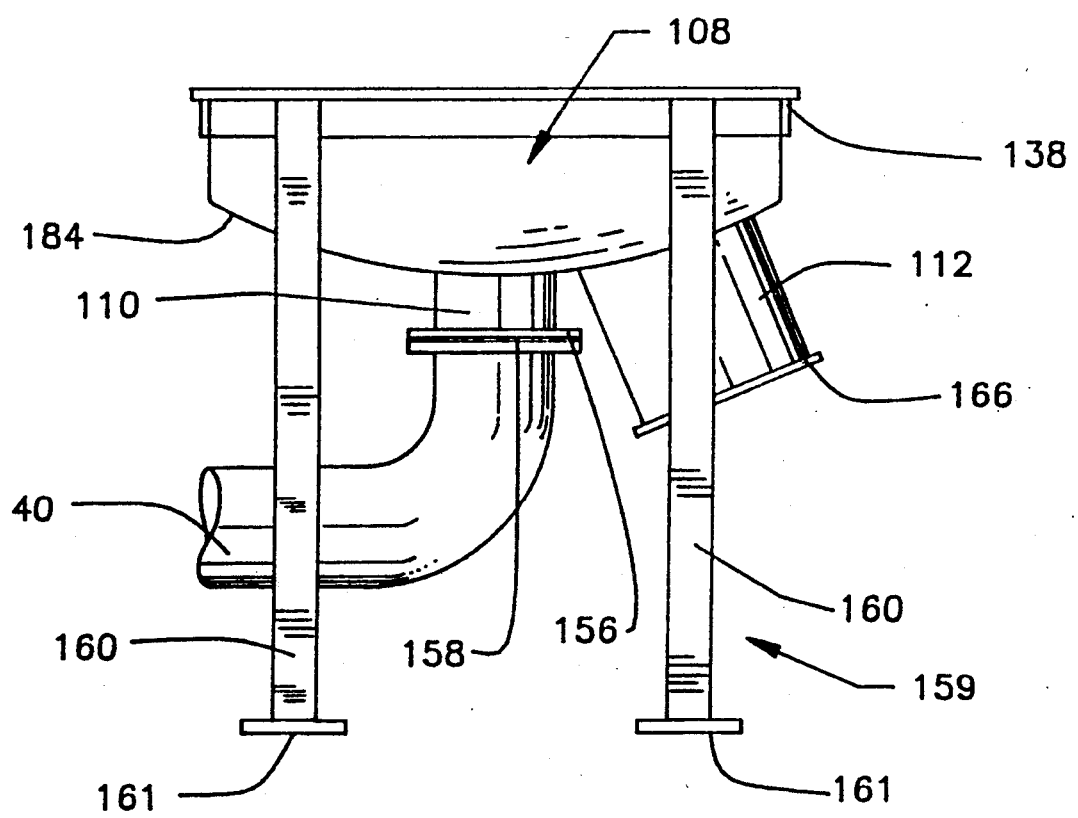
FIG. 8 is a side view of the present invention showing the bottom cap portion of the gas scrubber having support legs on base pads.

The bottom drain outlet 112 is located off-center and is permanently attached by welding to the convex surface area 184 of bottom cap member 108, as shown in FIGS. 5, 7, and 10. The bottom drain outlet 112 provides the means for draining and removing the spent scrubbant materials 124 after the gas reaction is completed. The drain outlet 112 has a circular stub-end lap joint flange 166 and circular flange gasket 168 to join with other piping, if necessary. The specifications of housing 100 for the gas-scrubber apparatus 50 may vary, including the diameter in feet (ft) of the housing 100, and the height in feet (ft) of the housing 100, and they are dependent upon the volumetric flow of the pollutant gases, the volumetric capacity needed for the particular scrubbants 124 being used, the percent efficiency desired for cleaning up the pollutant gas, and the pressure and temperature of the gas-scrubber system 10 in maintaining the proper process conditions. Based on these parameters, the diameter of housing 100 may vary in the range of 0.5 ft to 50 ft, but preferably in the range of 1.0 ft to 9.0 ft. The height of housing 100 may vary from 1 diameter to 20 diameters of housing 100, but preferably in the range of 2 diameters to 10 diameters of housing 100. The gas-stream velocity may be in the range of 0.1 ft/sec to 10.0 ft/sec but preferably is in the range of about 0.2 ft/sec to 2.0 ft/sec.

The materials of construction that are suitable for housing 100 are carbon steel, stainless steel, monel, inconel, or other types of stainless steel alloyed materials, depending upon the type of pollutant gases that are to be scrubbed from carrier stream 70.

For this particular embodiment, the following dimensional specifications are applicable:
1. The overall height of housing 100 equals 10 feet;
2. The diameter of housing 100 equals 3 feet;
3. The diameter of outlet port 104 equals 6 inches;
4. The height of solid-scrubbant bed 124 equals 9 feet;
5. The number of scrubber assemblies 114 equals 3 units;
6. The height of one scrubber assembly 114 is 3 feet;
7. Within each scrubber assembly 114, the number of thermo-convection pipes 120 is equal to eight pipes, with each pipe 120 measuring 3 inches in diameter by 18 inches in length;

8. Thermo-convection pipes 120 are angled inwardly at a 45° incline relative to outer wall member 106;
9. The diameter of inlet sparger assembly 110 equals 8 inches;
10. The diameter of drain outlet 112 equals 10 inches; and
11. The diameter of gas-exit port outlets 140 equals 2 inches.

OPERATION OF THE PRESENT INVENTION

Prior to the actual operation of the gas-scrubber system 10, one must determine the thermochemistry and the process kinetics of reaction of the gaseous stream 70 for the particular type of pollutants being scrubbed and removed, and one must determine the type of scrubbant(s) to be used for the removal of the toxic contaminants in the gaseous stream 70. There is an exothermic reaction between most of the scrubbants 124, which are inorganic minerals (such as oxides, carbonates, bicarbonates, or hydroxides) and the water and/or toxic chemicals, such as acids.

In particular, the heat of reaction and the heat of solution per pound of pollutant are determined for the types of scrubbant(s) 124 being used for the scrubbing operation. The information about heat of reaction and heat of solution determine if the toxic gaseous mixture has to be heated or cooled. For example, in most cases, where the concentration of the toxic contaminants are lower than 1% by volume, the gaseous mixture 70 and scrubber apparatus 50 have to be heated. In gaseous mixtures that contain a higher concentration of toxic contaminants, the energy balance has to be calculated in order to establish the design and operational criteria for the process, including whether heating and/or cooling may be needed, etc. Tabulated data of experimental runs assist in establishing the most efficient kinetics of reaction between the toxic pollutants and the percentage mixture of scrubbants 124 to be used for a given percentage of active ingredients.

The scrubbing operation can take place once the operational criteria are determined, such as temperature, pressure, volumetric flow of gas carrier, percentage mixture of scrubbants used, retention time, and efficiency of toxic pollutant removal; and once the equipment design specifications are determined, such as the number of scrubber assemblies 114 and the number of thermo-convection pipes 120 at angle alpha to be used.

The efficiency of the scrubbing operation is dependent on the efficiency of the adsorption/absorption, the rate of reaction, and the efficiency of the conversion capacity (toxic pollutant to an inert solid) of the solid scrubbants being used. In most cases, a combination of several different types of solid pure scrubbants 124 are used, which react to form the most stable inert compounds.

In the operation of the gas-scrubber system 10, the only pre-startup step is supplying the scrubbant mixture 124 as a solid bed into the interior chamber 174 of housing 100. This is achieved by the removal of top cover 102 from housing 100, whereby the scrubbants 124 are loaded through the top until there is a solid packed bed of scrubbants 124 extending from the bottom of housing 100 up to slightly below the internal wire-mesh air filter 126. The top cover 102 is then closed via flanges 130 and flange gasket 132, and actual operation of the gas-scrubber system 10 is ready to begin.

The operation of the gas-scrubbing system 10 starts with the contaminated gases 70 entering at room temperature into the silencer component 20, which operates to reduce by half the noise level in decibels as the gas enters into the gas blower apparatus 30. The variable speed gas blower 30 has a volumetric capacity in the range of 250 to 750 scfm (standard cubic feet per minute), with a maximum discharge pressure of 5 psig (pounds per square inch gauge) capable of pumping contaminated gases with pollutants having a concentration level up to 10% by volume, which requires a 25 Hp (horse power) motor to operate efficiently. The gas blower 30 discharges the contaminated gases 70 to be scrubbed into a gas heater system 40.

The gas-heater system 40 specifications are such that it has a 30 Kw (kilowatt) rating at a maximum voltage of 480 V, having six heating coils or elements 42 of 5000 watts each. The heating coils 42 are approximately 100 inches in total length each and have twelve gas baffles 44 to disperse and thoroughly mix the gaseous stream in order to get a uniform temperature, as shown in detail in FIG. 1. The diameter and length of the gas-heater system 40 are 8 inches and 8 feet, respectively. The contaminated gaseous mixture circulates thoroughly through the gas-heater system 40, and the temperature is elevated from room temperature (65° F. to 75° F.) to about the 250° F. range. The hot contaminated gaseous mixture 70 then enters into the gas-scrubber apparatus 50 through the inlet sparger assembly 110 at the bottom cap member 108 of housing 100.

The hot contaminated gaseous mixture 70 then passes from the inlet sparger assembly 110 in an upwardly circular fashion by the mechanical action of hot gases 70 going through the inner core pipe 146 having gas intake slits 149, and then through the middle air filter core 148, and finally through the gas-distribution pipe 150 having gas discharge slits 152. The hot gases 70 are then in the bottom cap 108 of interior chamber core 174 of housing 100.

The hot gases 70 then come in contact with the solid packed bed of scrubbant materials 124, where they initially react with the scrubbant materials 124 to form a non-hazardous metal salt compound. As the hot pollutant gases 70 rise through the interior chamber core space 174, there is a tendency for those hot gases 70 to follow a path of least resistance, and so they flow towards the interior surface areas 172 adjacent to outer wall member 106, where they come in contact with the first scrubber assembly 114A.

The hot gases 70 then come into contact with the internal perimeter ring 116 having angular baffle 118, which interrupts and diverts the flow of the gas stream 70 from the interior wall surface area 172 of wall member 106 and channels the gas stream 70 towards the central chamber core 174 of housing 100. The perimeter ring 116 with angular baffle 118 also acts as a collector of the hot gases 70 from off of the interior wall surface area 172 of wall member 106 and channels the hot gases 70 from under the baffle-catching space 186 up through the bundles of inwardly-angled thermo-convection pipes 120 through pipe inlet gas hole openings 176. This allows the hot gases 70 that have been accumulating in the baffle-catching space 186 to be transferred through the length of thermo-convection pipes 120 and to be discharged through side hole perforations 122 and/or the exit thermo-convection gas hole openings 188. The thermo-convection pipes 120 cause the build up of hot gases 70 to flow from the inside surface 172 of wall member 106 to the internal core portion 174 or center of housing 100 to increase the reaction between gases 70 and the solid bed of scrubbants 124 contained within scrubber apparatus 50. The two units of perimeter ring 116 with angular baffle 118 and the thermo-convection pipes 120 which make up scrubber assembly 114 operate to provide a uniform or isothermal heat distribution in a horizontal direction across the housing 100 and a vertical temperature gradient from bottom scrubber assembly 114A to the upper scrubber assembly 114C. As the hot contaminated gases 70 pass upwardly through housing 100, the temperature increases, and the gases 70 repeat the aforementioned sequence with .each succeeding scrubber assembly 114 within housing 100 of scrubber apparatus 50.

The vertical temperature gradient within gas scrubber 50 is maintained in two ways. First, the temperature setting of the heating strips 136 are set at each scrubber assembly 114, such that each scrubber assembly 114 has a higher temperature than the one below. Secondly, the heat of reaction between the hot toxic pollutant gases 70 and the scrubbant complexes 124 is exothermic, which produces additional heat energy, so the temperature of each scrubber assembly 114 increases in a vertical direction as the gaseous mixture 70 passes upwardly through the scrubbant complex 124.

The vertical temperature gradient extending from the bottom assembly 114A to the top assembly 114C ranges from about 250° F. to about 650° F. The temperature in the area of the lower scrubber assembly 114A is in the range of 250° F., while the temperature in the area of middle assembly 114B is in the range of 450° F. and the temperature in the area of upper assembly 114C is in the range of 650° F. The external heating element strips 136 help to maintain that vertical temperature gradient within each assembly unit 114. The external heating element strips 136 are set to operate in the range of about 70° F. above the process temperature to a high limit setting of the temperature in heating element 136. When the perimeter rings 116 with angular baffles 118 force the hot gases to travel through the thermo-convection pipes 120, the heat energy from the external heating element strips 136 is then transferred from the surface wall area 172 of wall member 106 to the solid bed of scrubbants 124 by convection, and the heat energy is also transferred by the conduction of the hot gases 70 that travel from the perimeter ring 116 with angular baffles 118 through the thermo-convection pipes 120 to the solid bed of scrubbants 124. The electrical heating element strips 136, having a capacity of 9 Kw (kilowatts), provide the necessary heat energy to maintain the vertical temperature gradient and also provide the BTU's (British Thermal Units) to the gas flow 70, which are also needed to maintain the vertical temperature gradient described above.

The thermo-couple sensors 134, having probes 190 of varying lengths, are installed such that they are positioned every 6 inches from the center core chamber area 174 to the inside surface area 172 of wall member 106 in order to sense the temperature at various points along the horizontal cross-section of the solid bed of scrubbants 124. Four thermo-couple sensors 134 for each horizontal cross-sectional area within the interior chamber space 174 indicate the temperatures in a four-channel display for that particular cross section. In the preferred embodiment, there are two horizontal cross-sectional areas within each scrubber assembly 114 having the thermo-couple sensors 134 probes 190 within. This is to show what the isothermal temperature condition is for each horizontal cross-sectional area that is induced by the different sets of thermo-convection pipes 120 in the different scrubber assemblies 114.

The perimeter rings 116 with angular baffles 118 and the thermo-convection pipes 120 within each scrubber assembly 114 provide thorough gas mixing and uniform gas flow through the solid bed of scrubbants 124. Approximately one-third of the gaseous flow 70 circulates near the interior surface wall 172 of wall member 106 and is redistributed by the mechanical means of gas 70 flowing from the perimeter ring 116 with angular baffle 118 through the thermo-convection pipes 120 within each scrubber assembly 114 of gas scrubber 50. This dynamic process action, as shown in detail in the drawings, provides the cross-sectional isothermal temperature condition and the uniform kinetic process reaction of the solid bed of scrubbants 124 within each scrubber assembly 114 of gas scrubber 50 for forming the non-hazardous, metal salt compound from the toxic pollutant gases 70. It should also be understood that the internal dynamics of the scrubbant complexes 124 which are used (since there may be several different scrubbants in the solid bed) in the assemblies 114 produce the activation energy for the adsorption/absorption and the corresponding chemical reaction with the pollutant gases (70) which provide a high percentage of efficiency of scrubbing action within the gas-scrubber apparatus 50 of the present invention.

After the toxic pollutant gases 70 have been reacted and scrubbed, the scrubber produces the clean air 75, which flows through the internal air filter 126. Filter 126 prevents any spent scrubbants 124 from being released into the atmosphere. Clean and filtered air 75 then passes through the outlet port 104 to the gas emission stack 60, where the clean air 75 is vented to the atmosphere.

When the aforementioned process of gas scrubbing within the gas scrubber 50 is completed and the consumable solid scrubbant(s) 124 are spent, samples of the scrubbant materials 124 are taken from the interior chamber core 174 from the bottom to the top of the solid scrubbant bed 124. The first sample is taken from the bottom interior cap section 108, and another sample is taken every foot and a half. Analyses of these samples of scrubbants 124 indicate the profile of the conversion of the solid scrubbants 124 to the non-hazardous metal salt compounds. As a function of the analysis of the results, the optimum high-conversion area of the solid-scrubbant bed 124 can be determined, and the average conversion in the mass-transfer zone will be found. The mass-transfer zone is defined as the zone where the majority of the conversion (the absorption/adsorption and chemical reaction, as previously mentioned) takes place. The minimum mass-transfer zone typically predicted for the solid scrubbants 124 in the interior chamber core space 174 of housing 100 is at a height of about one diameter of housing 100. The equilibrium zone for the solid scrubbants 124 in the interior chamber core area 174 of housing 100 is also at about one diameter of housing 100.

The spent scrubbants 124 are then collected in barrels or bins from the drain collection outlet 112, and the spent scrubbant material 124 is sent out for recycling. Recovery and recycling of spent scrubbant materials 124 allows them to be reused in gas scrubber 50. Also, some of the manufacturers of the scrubbant materials 124 buy back the spent scrubbants 124 and reprocess them for reuse, as a viable recycling effort for the user.

After the spent scrubbants 124 from the interior of housing 100 have been removed in total, the entire interior chamber area, including inlet sparger 110, internal perimeter rings 116 with angular baffles 118, thermo-convection pipes 120, and exiting air filter 126 are thoroughly steamed and washed clean to remove any residual toxic pollutants 70 or spent scrubbants 124. The gas-scrubber apparatus 50 is then ready to be reused for the next gas-scrubbing operation.

ADVANTAGES OF THE INVENTION

A primary advantage of the present invention is that gas-scrubber apparatus 50 provides a self-dynamic condition for mixing of the hot toxic gases 70 to provide a uniform temperature or heat distribution in the interior chamber core space 174. This is accomplished by the use of internal perimeter rings 116 and angular baffles 118 to collect the hot gases 70 at wall 106 and the use of thermo-convection pipes 120 for gas-flow transfer from wall 106 to the center 174 of housing 100.

Another advantage of the present invention is that the gas-scrubber apparatus 50 provides internal perimeter ring 116 with angular baffle 118, which acts as an interrupter to the path of the hot gaseous carrier stream 70 adjacent wall 106 and acts as a temporary collector of the hot gases 70 from the baffle-catching space 186, so they can be diverted inwardly to the interior center core chamber 174.

Another advantage of the present invention is that the gas-scrubber apparatus 50 provides thermo-convection pipes 120, which allow the hot gaseous stream 70 to flow toward the center from the baffle-catching space 186 of the inside surface area 172 and through the length of thermo-convection pipes 120 to be dispersed through side hole perforations 122 and/or exit pipe openings 188, which thereby transfers the hot gases 70 from the area adjacent wall 106 to the internal core portion 174 of housing 100.

Another advantage of the present invention is that the gas-scrubber system 10, as shown in FIG. 1, provides the apparatus within the gas-scrubber apparatus 50, which allows for the handling of high volumetry gas-flow rates without the need for filtration or dust-collection units because the gas-scrubber apparatus 50 is dust free.

Another advantage of the present invention is that the gas-scrubber apparatus 50 can handle high volumetric gas-flow rates of the incoming (influent) pollutant gas stream 70, such that the gas velocity can be varied from 0.03 to 3.0 feet per second. The prior art systems cannot handle such a wide range of velocity of gas streams.

Another advantage of the present invention is that gas-scrubber apparatus 50 provides for the scrubbing of a wide range of gaseous pollutants. The prior art devices cannot scrub such a wide range of toxic gaseous pollutants.

Another advantage of the present invention is that the gas-scrubber apparatus 50 in using a mixture of different consumable gas-scrubbant materials 124 provides for the total adsorption and/or absorption of the pollutants, wherein the chemical reaction between the incoming hot toxic gases 70 and scrubbant materials 124 results in an effluent gas stream containing less than ten parts per billion (10.0 ppb) of gaseous pollutant 70, so that the effluent gas stream 75 contains less toxic pollutant(s) than any other prior gas scrubber.

Another advantage of the present invention is that the gas-scrubber apparatus 50 uses consumable-scrubbant materials 124, and when the process operation has been completed, the spent residual-scrubbant materials 124 are in a non-hazardous form, such that, in most cases, it can be used as landfill immediately with no need to handle and dispose of the residual-scrubbant material as hazardous waste material; or, in some cases, the spent-scrubbant materials can be recovered, recycled, reprocessed, and reused again.

Another advantage of the present invention is that the gas-scrubber apparatus 50 uses consumable-scrubbant materials 124, wherein the bulk densities of the raw-scrubbant materials (unreacted) and that of the spent residual-scrubbant materials are very similar, so that there is no need for any critical design considerations for the gas-scrubber apparatus 50.

Another advantage of the present invention is that the gas-scrubber apparatus 50 uses consumable-scrubbant materials 124 that do not require any scrubbant activation procedures in the processing methodology for the scrubbing of the gaseous pollutants 70 in the gas-scrubbing system 10.

Another advantage of the present invention is that the gas-scrubber apparatus 50 uses consumable-scrubbant materials 124, wherein the unreacted/raw scrubbant materials of the solid bed are relatively inexpensive, easily obtained and, in some cases, recyclable, and wherein the manufacturer of the scrubbant materials typically buy back the spent scrubbant and reprocess it, thereby saving operational costs for the gas-scrubbing system of the present invention.

Another advantage of the present invention is that in using the process of the gas-scrubbing system 10, the system operates within a moderate temperature range, which results in low-energy costs and low-operating costs.

Still another advantage of the present invention is that the gas-scrubbing system 10 is virtually free of moving mechanical parts. The only moving mechanical parts are in the gas blower 30, whereas, the gas-scrubber apparatus 50 is completely free of moving mechanical parts which makes the entire system easy to clean, easy to replace worn parts, and easy to maintain, thereby further reducing operating costs for the system.

A latitude of modification, change, and substitution is intended in the foregoing disclosure, and in some instances, some features of the invention will be employed without a corresponding use of other features. Accordingly, it is appropriate that the appended claims be construed broadly and in a manner consistent with the spirit and scope of the invention herein.

What is claimed is:

1. A gas-scrubber apparatus, comprising:
   a) a chamber having an inlet means for receiving polluted gases to be scrubbed and having outlet means through which scrubbed gases are discharged;
   b) means for heating said chamber to maintain said polluted gases at predetermined temperature levels between said inlet means and said outlet means;
   c) said chamber having a reaction zone for receiving scrubbant materials for reacting with said polluted gases;

d) means for directing said polluted gases to travel through said chamber to react with said scrubbant materials;

e) at least one scrubber assembly mounted in the reaction zone of said chamber having means for collecting said polluted gases in the area adjacent the wall of said chamber; and f) said scrubber assembly including transfer means in the form of a plurality of thermo-convection pipes for transferring said collected polluted gases from said wall area toward the center of said chamber to maintain a substantially uniform heat distribution across said scrubber assembly.

2. A gas-scrubber apparatus in accordance with claim 1, wherein said means for collecting includes a baffle member extending along the wall of said chamber for collecting said polluted gases and for directing said polluted gases to said thermo-convection pipes for transferring said polluted gases away from said chamber wall and toward the center of said chamber.

3. A gas-scrubber apparatus in accordance with claim 1, wherein said thermo-convection pipes are disposed at an angle relative to said chamber wall and wherein outer ends of said thermo-convection pipes are adjacent said chamber wall and wherein inner ends of said thermo-convection pipes are adjacent the center of said chamber.

4. A gas-scrubber apparatus in accordance with claim 1, wherein said chamber includes a removable cover for supplying scrubbant materials to said reaction zone.

5. A gas-scrubber apparatus in accordance with claim 1, wherein said chamber includes means for removing scrubbant materials from said chamber after the reaction.

6. A gas-scrubber apparatus in accordance with claim 1, further including a filter adjacent said outlet means to filter out said scrubbant materials from said scrubbed gases.

7. A gas-scrubber apparatus in accordance with claim 1, wherein said chamber includes temperature sensors for determining the temperature at various points in said chamber.

8. A gas-scrubber apparatus in accordance with claim 1, wherein the height of said chamber is equal to two to ten times a diameter of said chamber.

9. A gas-scrubber apparatus in accordance with claim 1, wherein said reaction zone for receiving scrubbant materials is at least 80% of said chamber.

10. A gas-scrubber apparatus in accordance with claim 1, wherein the number of scrubber assemblies in said chamber is equal to the height of said reaction zone divided by the height of one scrubber assembly.

11. A gas-scrubber apparatus in accordance with claim 3, wherein said thermo-convection pipes are perforated and are disposed at an angle of 15° to 75° relative to said chamber wall.

12. A gas-scrubber apparatus in accordance with claim 1, wherein said means for directing said polluted gases includes a gas-blower assembly for blowing said polluted gases through said chamber.

13. A gas-scrubber apparatus in accordance with claim 1, further including a gas-heater system for pre-heating said polluted gases before they enter said chamber.

14. A gas-scrubber apparatus in accordance with claim 1, wherein three spaced-apart scrubber assemblies are mounted in the reaction zone of said chamber.

15. A gas-scrubber apparatus in accordance with claim 1, wherein said scrubber assembly is circular in shape and has a central opening through which said polluted gases and scrubbant materials pass and wherein said plurality of thermo-convection pipes are disposed at an angle relative to said chamber wall and extend toward the center of said chamber.

16. A gas-scrubber apparatus in accordance with claim 2, wherein said baffle member is circular in shape and is disposed at an angle relative to said chamber wall and forms a gas-collecting zone between said baffle member and said chamber wall and wherein said thermo-convection pipes cooperate with said gas-collecting zone for receiving and transferring said polluted gases.

17. A gas-scrubber apparatus in accordance with claim 3, wherein said thermo-convection pipes include gas openings formed therein along the length thereof.

18. A gas-scrubber apparatus in accordance with claim 1, wherein said means for heating include heating elements mounted on said chamber wall for the heating of the polluted gases within said chamber.

19. A gas-scrubber apparatus in accordance with claim 1, further including a sparger assembly mounted at the inlet end of said chamber for receiving said polluted gases and for imparting to said polluted gases a circular movement before said polluted gases enter said reaction zone.

20. A gas-scrubber apparatus in accordance with claim 19, wherein said sparger assembly includes a filter for filtering out particulate matter and openings formed therein for allowing said polluted gases to move from said sparger assembly to said reaction zone.

21. A gas-scrubber apparatus in accordance with claim 1, wherein said scrubbant materials are solid materials selected from the group consisting of oxides, hydroxides, and carbonates.

22. A gas-scrubber apparatus in accordance with claim 1, wherein said means for heating provides a temperature gradient in said reaction zone, which increases in temperature from said inlet means at the lower end of said chamber to said outlet means at the upper end of said chamber.

23. A gas-scrubber apparatus in accordance with claim 1, wherein said scrubber assembly maintains a substantially isothermal condition across the width of said chamber from wall to wall.

24. A gas scrubber apparatus in accordance with claim 3, wherein each thermo-convection pipe has a length equal to one radius of said chamber, and is disposed at an angle of 30° to 60° relative to said chamber wall.

* * * * *